US008690518B2

(12) United States Patent
Monti

(10) Patent No.: US 8,690,518 B2
(45) Date of Patent: Apr. 8, 2014

(54) METHOD FOR SUPPLYING BLANKS TO A MARKING APPARATUS, A CONVEYOR DEVICE FOR TRANSPORTING BLANKS AND A TRANSFER DEVICE FOR BLANKS

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 177 days.

(21) Appl. No.: 13/329,537

(22) Filed: Dec. 19, 2011

(65) Prior Publication Data

US 2012/0156001 A1    Jun. 21, 2012

(30) Foreign Application Priority Data

Dec. 21, 2010 (IT) .............................. BO2010A00746

(51) Int. Cl.
| B65H 1/26 | (2006.01) |
| B65H 33/00 | (2006.01) |
| B65H 33/18 | (2006.01) |
| H01M 10/06 | (2006.01) |
| H01M 10/14 | (2006.01) |

(52) U.S. Cl.
USPC .................. 414/790.4; 414/798.2; 414/795.8; 198/456

(58) Field of Classification Search
USPC ............... 198/418.6, 419.3, 549, 732, 803.1; 271/157, 294; 414/790.4, 795.8, 796.5, 414/797, 798.9; 53/542
See application file for complete search history.

(56) References Cited

U.S. PATENT DOCUMENTS

| 4,487,405 | A | * | 12/1984 | Stobb ........................... 270/58.2 |
| 4,645,062 | A | * | 2/1987 | Kopp ............................ 198/448 |
| 4,681,502 | A | * | 7/1987 | Staufner .................... 414/795.8 |
| 5,044,876 | A | * | 9/1991 | Stohlquist .................. 414/798.2 |
| 5,052,679 | A | * | 10/1991 | Sekino ........................... 271/293 |
| 5,765,823 | A | * | 6/1998 | Meier et al. ................ 270/58.23 |
| 5,785,488 | A | * | 7/1998 | Raschke et al. ............ 414/798.9 |
| 7,063,313 | B2 | * | 6/2006 | Leu et al. .................... 270/52.27 |
| 7,533,767 | B2 | * | 5/2009 | Hopwood et al. ......... 198/419.3 |
| 2009/0020938 | A1 | * | 1/2009 | Honegger ................... 270/58.23 |

FOREIGN PATENT DOCUMENTS

| DE | 20 2005 006357 U1 | 6/2006 |
| EP | 1526384 A | 4/2005 |
| JP | 7002225 A | 1/1995 |
| WO | WO02/00538 A | 1/2002 |

OTHER PUBLICATIONS

European Search Report for EP 2 468 664 A1, completed Mar. 22, 2012, 2 pages.

* cited by examiner

*Primary Examiner* — Gregory Adams
(74) *Attorney, Agent, or Firm* — William J. Sapone; Ware Fressola Maguire & Barber LLP

(57) ABSTRACT

Disclosed are a method for supplying blanks to a marking apparatus, a conveyor device (1) and a transfer device (3) which can cooperate to actuate the method. The method steps include predisposing a quantity of blanks formed in a stack (2), arranging the stack (2) in an inclined configuration resting both on the base (21) thereof and on one side (22), bringing the stack (2) up to a removing position in proximity to the marking apparatus (4), rotating the upper blank (20) upwards and with respect to a horizontal axis (O) passing at an edge of the blank (20) which is opposite and more peripheral with respect to the edge of the same blank (20), raising the rotated upper blank (20), and bringing the upper blank (20) to the marking apparatus inlet (40), so that the blank is taken by the marking apparatus (4), and repeating for each blank.

10 Claims, 4 Drawing Sheets

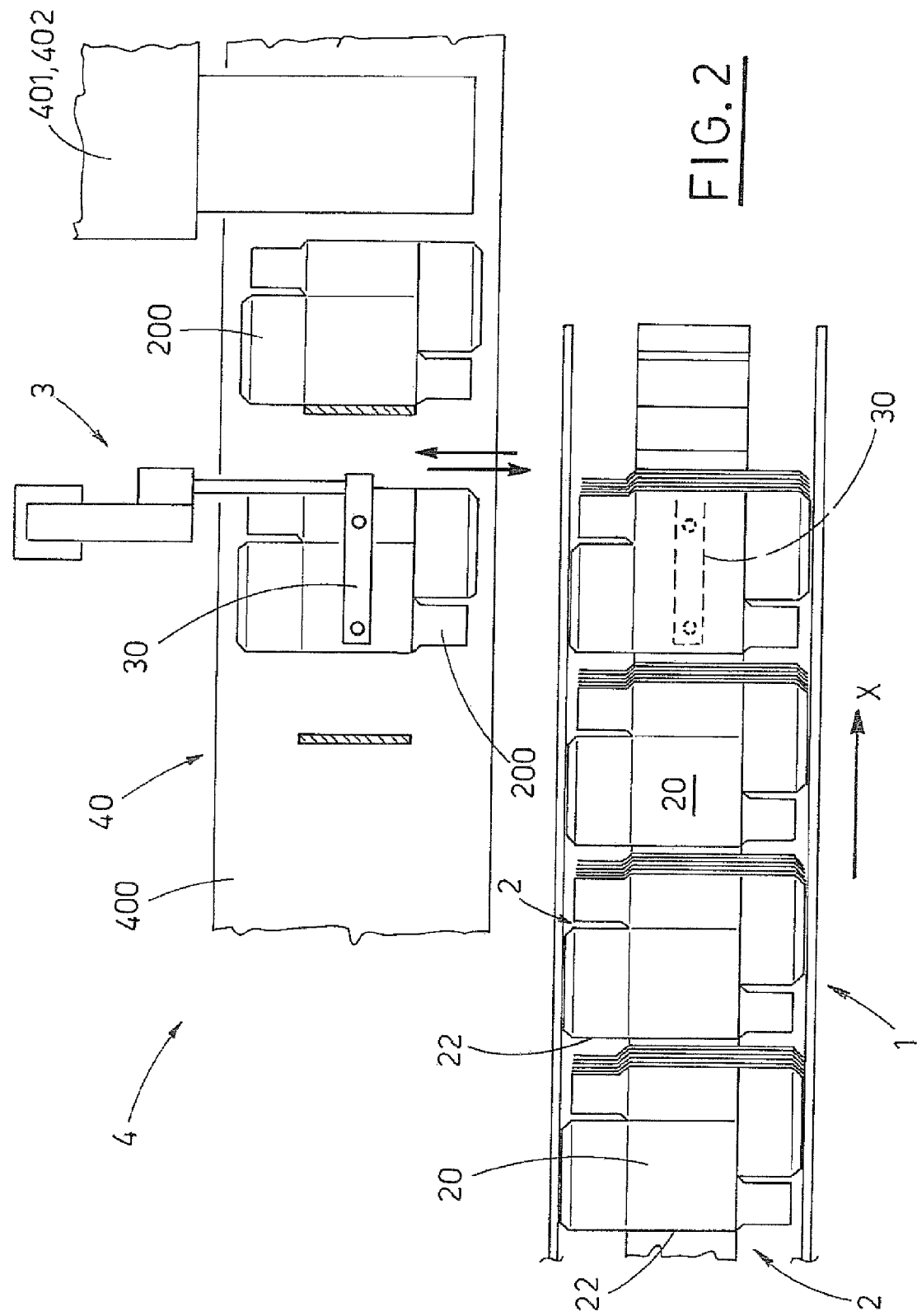

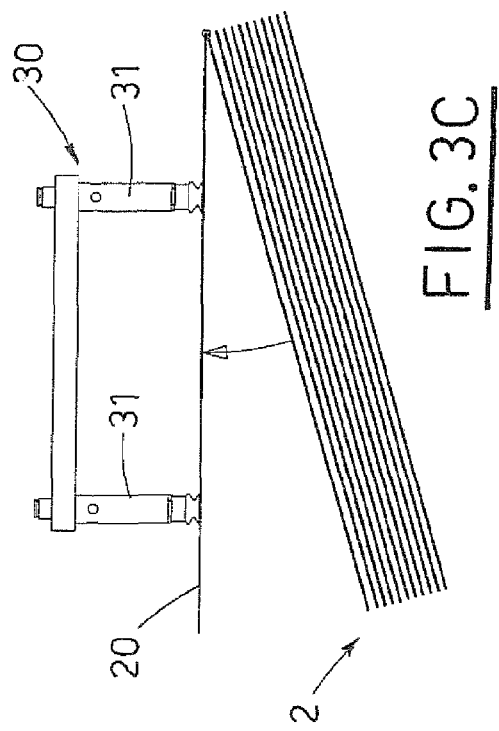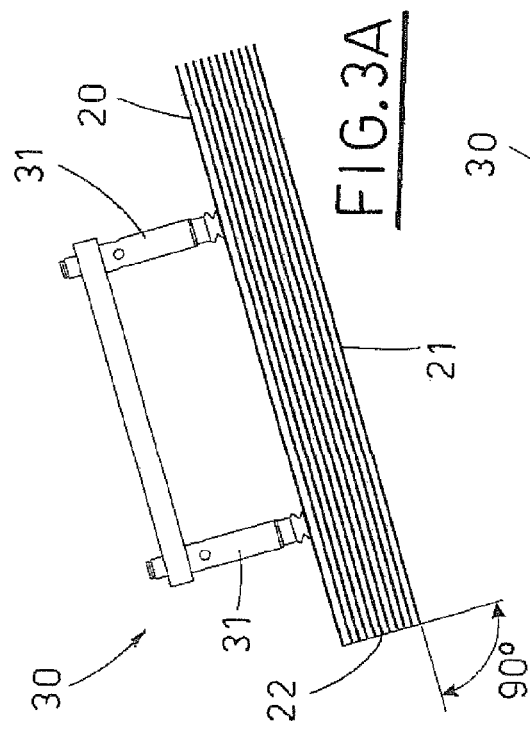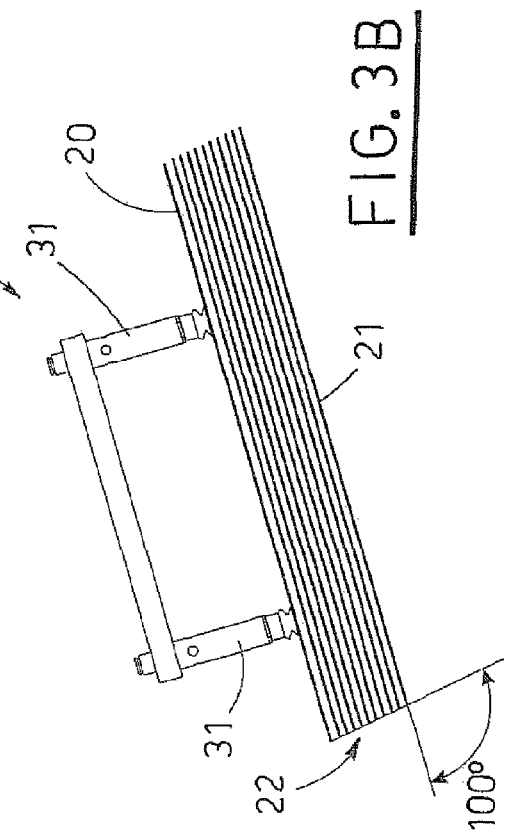

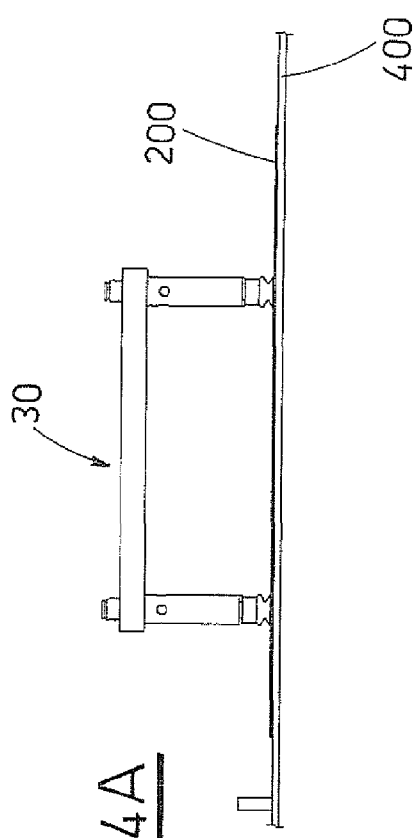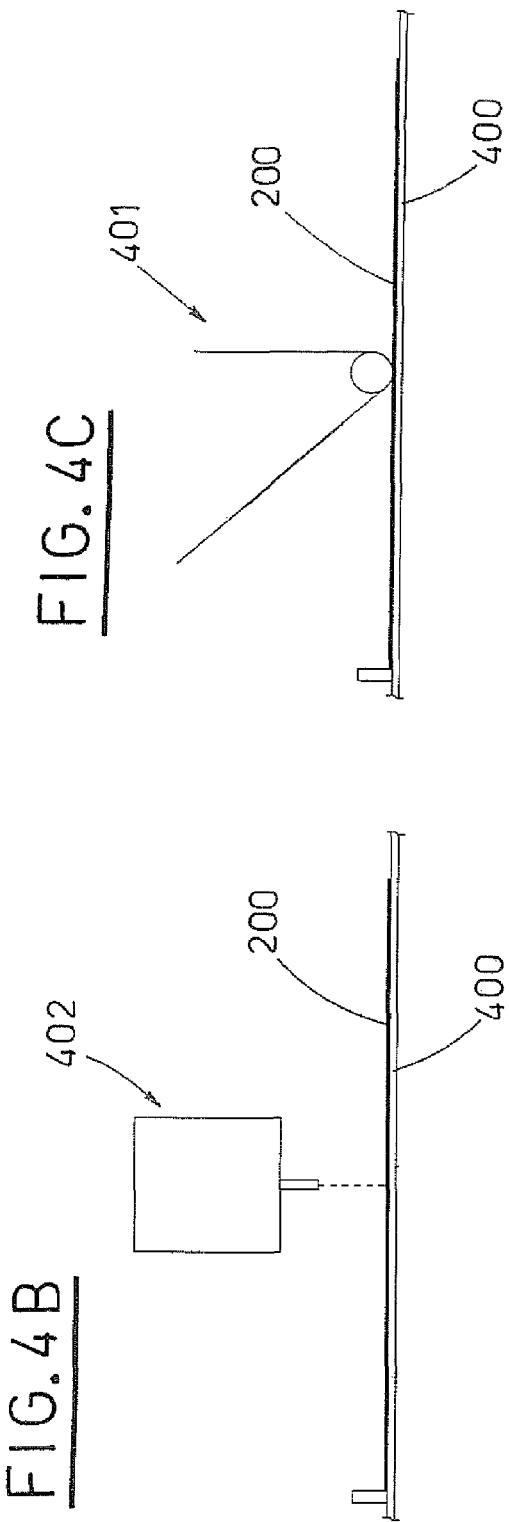

METHOD FOR SUPPLYING BLANKS TO A MARKING APPARATUS, A CONVEYOR DEVICE FOR TRANSPORTING BLANKS AND A TRANSFER DEVICE FOR BLANKS

FIELD OF THE INVENTION

The present invention relates to the sector of blanks destined to form packages for articles such as for example blister packs for pharmaceutical products, small jars for cosmetic products, trays for carrying vials containing perfume, etc.

DESCRIPTION OF THE PRIOR ART

At present, blanks in arrival at the firm that packs the cited articles are already provided with all the graphic features that will adorn the finished package and ready to receive the articles so that they can be put up for sale. The graphic features comprise not only logos, marks and images aimed at attracting the attention of the consumer or at evoking the use of the product, but also identifying signs of the articles contained, such as bar codes, and information relating to the market destination, in the geographical and/or linguistic sense.

The above-mentioned firms use paper and card firms which perform, on the original card, painting, printing and blanking operations, such as to provide the thus-readied blanks in stacks, ready for the receiving companies to use, taking them singly and opening them out, thus forming the packages, which are then filled with the above-mentioned articles and closed, packed and dispatched.

The companies that produce, package and put up for public sale the above-mentioned articles at present feel the need for flexibility when attaching identifying signs and data on the blanks relating to the market destination of the products.

The packages containing a given product are placed in various markets, i.e. they are sent to a multiplicity of countries, in which different languages are spoken, or even where the commercial name of a same product might not be the same, or where there are special standards relating to the printing of identifying codes, or even where the laws establishing which data has to be printed on the package containing the products are different, and so on.

At present, companies are forced to place special orders with the paper-card firms, even where they require only a small number of commissions for a given market, which is disadvantageous both in terms of costs and time, while the globalization of markets, and the large number of competitors, mean that real-time responses and sharp changes in the requirements of the various markets have to be catered for.

SUMMARY OF THE INVENTION

The aim of the present invention is to obviate these and other drawbacks, providing, according to claim 1, a method for supplying blanks to a marking apparatus for applying signs and/or labels to the surface of blanks, having an inlet for taking delivery of the blanks, each blank being presented either in an open configuration and flat or in a flattened tubular configuration.

The disclosed method comprises the following steps:
a. predisposing a quantity of blanks piled one on another to form a stack, having a base defined by a blank located at a bottom of the stack, a top defined by an upper blank placed onto the other blanks in the stack, and a plurality of sides, each of which is defined by a set of lateral edges of the plurality of blanks which faces in the same direction;
b. arranging the stack in an inclined configuration in which it is resting both on the base thereof and on a side thereof, with each of the blanks in the stack resting both on a lower surface thereof and on a lateral edge thereof comprised in the set defining the rested side thereof;
c. bringing the stack, while maintaining it in the inclined configuration, up to a removing position in proximity of the marking apparatus;
d. rotating the upper blank upwards and with respect to a horizontal axis passing at an edge of the blank which is opposite and more peripheral with respect to the edge of the same blank comprised in the set defining the rested side of the stack, the axis remaining fixed with respect to the stack during the rotation of the upper blank;
e. raising the rotated upper blank, distancing it from the stack, and then bringing the upper blank to the inlet of the marking apparatus, whereby the blank can be taken delivery of by the marking apparatus;
f. repeating step d. and step e., applying them to each blank which in turn defines the top of the stack, including the blank defining the base of the stack when the said blank remains as the only blank in the stack.

In the following it is explained how the method of the invention obviates the above-cited drawbacks and the special advantages its application brings.

Firstly, the method enables using blanks in the ways in which they are usually presented by paper-card firms, i.e. stacked on one another, each being open and flat or pre-glued in a flattened tubular configuration, each possibly having the basic graphic elements (logos, figures, colors etc.) printed on them; these stacks, as they are presented, can be directly used, or smaller stacks can be used (which in effect are simply fractions of the presented stacks), as can higher stacks, which are indeed more than one stack placed on another (see in particular step a).

The method also enables carrying the stacks to the marking apparatus (see step c) such as to provide single blanks in inlet (see steps d, e and f), which are therefore predisposed for application of labels or for the printing of information relating to the destined market.

It follows that with the method of the invention, at any moment it can be decided which labels or information relating to the market destination are to be applied on the surface of the single blank, consequently obtaining the maximum flexibility and avoiding all the costs and work time of the above-mentioned drawbacks.

Apart from the above, the invention offers the advantages which are illustrated in the following after a critical point that typically occurs when blanks are presented in stacks has been explained.

When the blanks are to be drawn out singly, for example so that they can be opened out, they are removed one at a time from the top of the stack, which for example is lying resting on its base (i.e. the bottom blank, the blank beneath the others) on a horizontal plane.

It has been found that the contacting surfaces of the contiguous blanks in the stack tend to attach to one another and a certain adherence takes place.

It can therefore happen that another blank remains attached below the one removed from the stack, which then falls to the floor randomly and has to be manually picked up and usually thrown away.

Not only this, but during the removal of the top blank, it often happens that the immediately lower one is also subject to adherence and in general the friction produced by the tangential rubbing of the respective contacting surfaces of the two blanks which can excessively dealign one or more blanks in the stack, thus compromising the cyclical removal operations.

The proposed method is put together such as to be completely immune from the above-described risks.

In fact, and especially in step b, the stack is set up in an inclined arrangement in which each blank is not only resting on the lower surface but also on one of its edges, and this sharing-out of the weight reduces the above-mentioned adherence, and the tendency of the blanks to attach to one another.

The top blank is rotated in the ways duly explained in step d, such that there is no dragging between the lower surface of the rotated blank and the upper surface of the blank located immediately below, and therefore the problems due to adherence are completely prevented.

Not only this, but if for some reason the blank below the removed one is initially even weakly attached to the upper blank, during the rotation of the blank the other blank would immediately detach due to the angular momentum produced by the gravity on the edge which contributes to forming the above-named rested side, returning into the original position thereof in the stack.

After this, during step e, the top blank, rotated, is simply raised vertically, and as this operation does not cause dragging, no problems of friction, or of any other nature, emerge.

The Applicant has verified that if the internal angle formed between the rested base and the rested side of the stack when in the inclined arrangement of step b is a right angle or an obtuse angle, the advantages are increased, because the above-mentioned sharing-out of the weight of the blanks is greater than when the angle is an acute one.

In particular, the Applicant has verified that if the angle is 100 degrees, there is a good weight distribution of the stack, without the shared part on the rest side of the stack being excessive and thus risking compromising the integrity of the stack during the movement thereof.

During actuation of the method, various stacks preferably are predisposed, for example all the same, in a straight line in which each stack is in the inclined configuration as described for step b.

The line is advanced longitudinally, with a step-advancement up to when a first stack in the line reaches the above-mentioned collecting position, when the line stops to enable whole stacks to be processed at a time.

At this point the first stack, or the first stack and one or more stacks, are processed, i.e. the blanks are gradually removed starting, obviously, from the top one.

In practice the following operations are cyclically performed: steps d, e and f (rotation or raising) are applied to the blanks one by one on the top of the first stack located in the collecting position, while in the meantime one or more further stacks are added to the queue at the end of the line of stacks.

After this, once all the blanks of the first stack that were in the collecting position have been taken to the input of the marking apparatus, the line of stacks, exhibiting a new first stack, is step-advanced up to when the first stack reaches the collecting position, etc.

Advantages obtained by the disclosed method are attained by using the conveyor device of claim 5 and the transfer device of claim 11, which are made to be used together and thus actuate the present method.

The conveyor device for transporting the blanks destined to form packages comprise at least a mobile housing destined to house and convey a quantity of blanks stacked one on another to form a stack, like the one described herein above.

Each of the housings comprises a first rest surface and a second rest surface, both flat, oblique with respect to horizontal planes, which first and second surfaces are inclined with respect to one another by an internal angle which is a right-angle or an obtuse angle such as to define a seating having a V-profile, the first and second rest surfaces being of such dimensions that a stack of blanks can be received and conveyed resting in the V-seating with the base thereof resting on the first surface and with a rest side of the stack resting on the second surface over a full height thereof such as to define, between the base and the side of the stack, and angle which is equal to the angle between the first and the second surface of the V-seating.

The stack that is housed and transported by the mobile housing is in the above arrangement inclined, in which each of the blanks is resting both on a lower surface thereof and on a lateral side thereof.

The transfer device can functionally cooperate with the conveyor device and with the above-mentioned marking apparatus.

The transfer device comprises:

a collecting robot having at least three degrees of freedom comprising a collecting head which is rotatable with respect to a horizontal rotation axis, the head further being vertically mobile and translatable in a direction or a plurality of directions in space; and depression means fixedly mounted in the collecting head comprising at least a contact element for abutting a blank and connecting it to a depression source activatable and deactivatable such that the depression means can alternatingly grip or release a blank abutting with the contact element.

An essential peculiarity of the transfer device of the invention is that the horizontal rotation axis of the collecting head is arranged, with respect to the contact element, in such a way that when the robot is commanded to place the contact element I contact with the top blank located at the top of a stack presented in an inclined configuration in which there is a right-angle or an obtuse angle between the bottom thereof and a side thereof, defined by lateral edges of the blanks which are facing in the same direction, the horizontal rotation axis passes through an edge of the top blank that is opposite and more peripheral with respect to an edge of the uppermost blank that is comprised in the totality defining the side.

It follows that the conveyor device can rotate the blanks (taken one at a time by means of the depression means) in the same way in which they are rotated in step d of the method and then, as the collecting head is raisable, can take them away from the stack in the same way as is envisaged by step e of the method.

Thus, by using the transfer device, the blanks can be cyclically transported from the conveyor device to the input of the marking apparatus, where they can be collected.

BRIEF DESCRIPTION OF THE DRAWINGS

Specific embodiments of the invention, and advantageous technical-functional characteristics correlated to embodiments thereof only partially derivable from the above description, will be described in the following of the present description, according to what is set out in the claims and with the aid of the accompanying figures of the drawings, in which:

FIG. 2 is a schematic view from above of the conveyor device which functionally collaborates with the conveyor device and the conveyor device which cooperates with the marking apparatus;

FIGS. 3A, 3B and 3C are lateral schematic views of the step of engaging the collecting head of the conveyor device with the top blank of a stack; and FIGS. 4A, 4B and 4C represent three moments of the processing of a single blank supplied to the marking apparatus.

DESCRIPTION OF PREFERRED EMBODIMENTS

Figure 1:
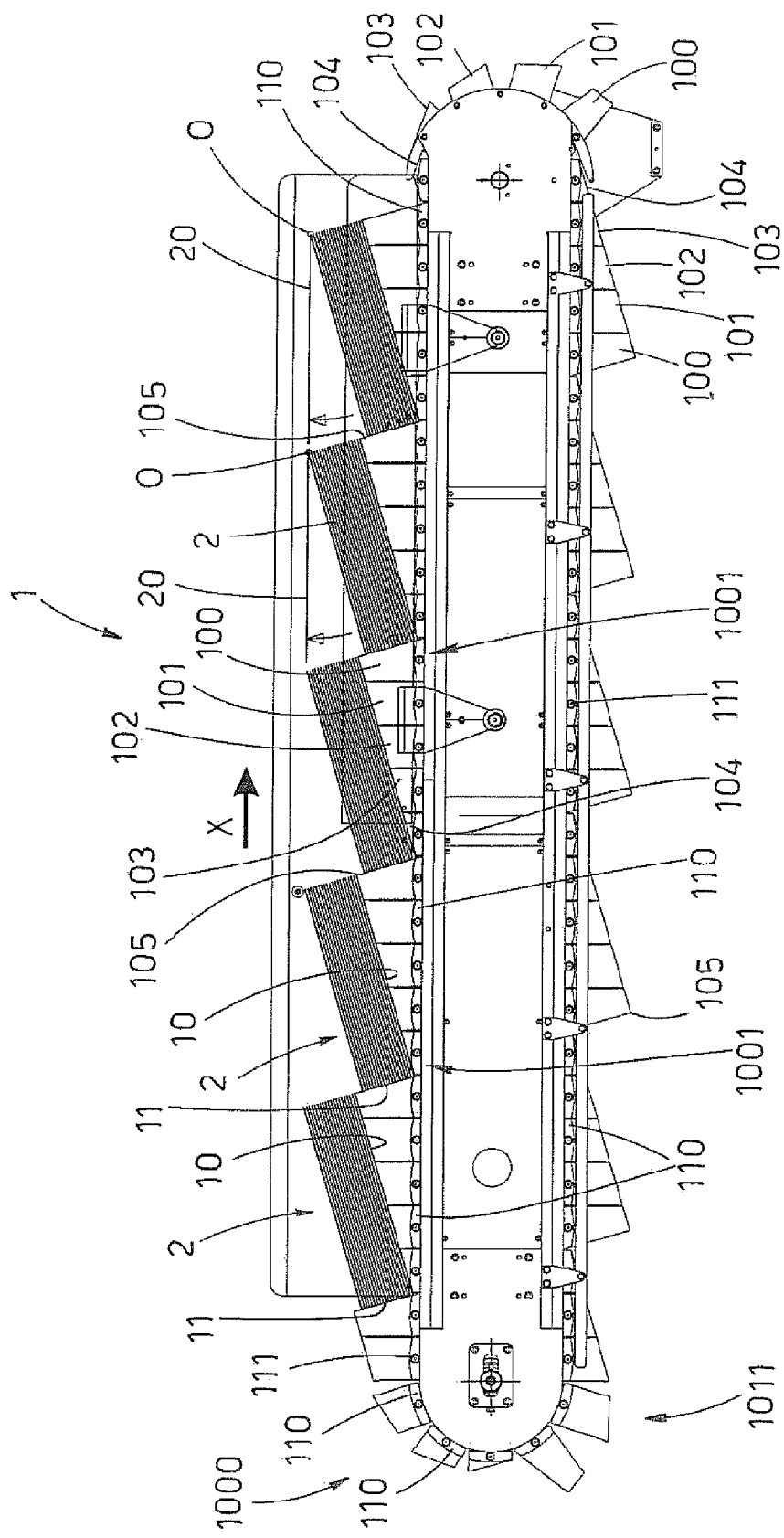
FIG. 1 is a lateral view of the conveyor device.

In the accompanying figures, 1 denotes the conveyor device in its entirety.

Before proceeding with an explanation of the structure and functioning of the conveyor device 1, for reasons of explanatory clarity, we state that the blanks are represented in some of the figures in the flattened tubular configuration (see in particular FIG. 2), in which they have a substantially quadrangular periphery, although this should not be taken as a limiting aspect of the invention.

The blanks are represented stacked in stacks 2, which have a base 21 defined by a blank located on the bottom of the stack 2, a top defined by a top blank 20 located above the other blanks in the stack 2, and a plurality of sides, each of which is defined by a totality of lateral edges of the various blanks facing in the same direction (the above-mentioned rested side of the stack is denoted by 22).

As can be seen in FIG. 1, the conveyor device 1 comprises a plurality of mobile housings 10,11,100,101,102,103,104, described in detail herein below, which each house a respective stack 2 and transport it in a conveying direction X with a movement that is preferably a step-motion.

FIG. 1 represents five housings arranged in a line and destined to slide longitudinally.

Each housing comprises a first rest surface 10 and a second rest surface 11, both being flat and oblique with respect to horizontal planes.

The first and the second rest surfaces 10, 11 are inclined with respect to one another by an internal angle that is a right-angle or an obtuse angle, such as to define a seating having a V-profile, which receives the stacks 2 that are therefore inclined.

In detail, the first and the second rest surface 10, 11 are of such dimensions that the stack 2 is received thereby and conveyed resting on the V-seating with the base 21 thereof resting on the first surface 10 and with the rest side 22 of the stack 2 rested on the second surface 11 over the whole height thereof.

In this way, between the base 21 and the rest side 22 an angle is formed which is equal to the angle between the first and the second surface of the V-seating (see FIGS. 3A and 3B).

The first and second surface 10, 11 preferably have dimensions that are sufficient to abut the whole extension of the base 21 and the rested side 22 of a stack 2.

In practice, the stack 2, when housed in the housing 10, 11, 100, 101, 102, 103, 104, is inclined in the desired way with each of the blanks resting both on a lower surface thereof and on a lateral edge thereof, which is what makes it possible to obtain various advantages as already explained above.

Therefore, for reasons already given, the angle between the first and the second surface 10, 22 is preferably one hundred degrees (as duly illustrated in FIG. 3B).

The transport direction X (see FIGS. 1 and 2) is preferably such that the rested side 22 of the stack 2 is further back with respect to an opposite side, and it is the rested side 22 which is interested by the stresses of the inertia, or friction with air, due to the motion of the stack 2 and to the resting thereof on the second rest side of the V-seating.

In this way, the inertia or the friction with the air acting on the blanks during the transport is prevented from causing the blanks to slide away from the respective stack 2.

Before more completely explaining the preferred modalities for realizing the conveyor device 1, we will first explain the functioning thereof and the way in which it can functionally cooperate with the transfer device 3, such as practically to define a supply system for supplying blanks to a marking apparatus.

As already mentioned, the housings for the stacks 2 of blanks preferably proceed in a step-motion and, when cyclically stationary, those which are at the further end of the conveyor device 1 (further back with respect to the transport direction X) are loaded with the respective stacks 2.

After this, the housings advance by one or more steps, on the basis of their number and how many of them are emptied contemporaneously in the way described herein below; in this way, obviously, the blanks are brought into the vicinity of the marking apparatus 4, or rather the vicinity of the input 40 (as can clearly be seen in FIG. 2).

In practice, when one or more housings which restingly support inclined stacks 2 are in the respective collecting position, the transfer of the blanks begins, one at a time for each stack 2 (and in the meantime the empty housings arranged further back in the conveyor device 1 are filled manually or automatically).

Even when in the collecting position, the stacks 2 are inclined in the above-described manner.

At this point, for a given collection cycle, the conveyor device 3 intervenes, which comprises a collecting robot 3 having at least three degrees of freedom (preferably four), in turn comprising a collecting head 30 that is rotatable with respect to a horizontal rotation axis (first degree of freedom), vertically mobile (second degree) and translatable in one or more directions in space (third and possible fourth degree of freedom).

It is clear that the robot 3 is suitably positionable in proximity of both the conveyor device 1 and the marking apparatus 4 such as to be able to operate at least between the collecting position of the housings of the former and the input 40 of the latter.

The robot 3 comprises depression means that are fixed in the collecting head 30 and comprise two contact elements 31 for encountering a blank and connecting it to a depression source, which preferably have tubes that can place in communication a depression source (of any type known in the sector, as long as it is suitable for the purpose) which bear suckers at the free end thereof, which have a passage for placing the source and the blank abutting against the suckers in fluid-dynamic communication.

What is important is that these contact elements 31 are suitably dimensioned and arranged such as to be able together to encounter a blank and rotate it, as explained below, and then translate it as described.

The depression source is activatable and deactivatable such as to be able to enable the depression means alternatively to grip and release a blank encountered by the contact element 31.

The robot 3 is automatically activated such as to arrange the collecting head 30 above the top blank 20 in the stack (FIG. 3A and FIG. 3B) with the head 30 parallel to the top blank 30 and with the contact elements having free ends (bearing the suckers) in contact with the upper surface of the top blank 20, and therefore arranged on a plane which is inclined by a right-angle or an obtuse angle.

The top blank 20 has an edge comprised in the rested side 22 of the stack 2 arranged inferiorly of an opposite advance edge, as the second rest surface 11 on which it is rested is inclined by an angle of at least ninety degrees with respect to the first surface 10, which further implies that the upwards rotation, which precedes the completion of the collection, is in no way obstructed.

It is significant that the transfer device 3 is arranged such that the horizontal rotation axis of the collecting head 30 is arranged, with respect to the contact elements 31, in such a way that when the elements 31 are abutting with the top blank 20, the transfer device 3 coincides with a horizontal axis 0 which passes at the edge of the top blank 20 which is opposite, advanced and more peripheral (with respect to the edge of the rested side 11).

In practice, to be clear, the horizontal rotation axis of the collecting head 30 is arranged with respect to the contact element 31 such that when the robot 3 is commanded to place the contact element 31 against the top blank 20 of a stack 2 which is presented to the transfer device 3 in an inclined configuration in which there is a right-angle or an obtuse angle between the bottom 21 and a side 22 thereof, then the horizontal rotation axis 0 passes at an edge of the top blank 20 opposite and more peripheral than an edge of the blank 20 comprised in the side 22.

It is clear that this advantageous and original particular is implementable in the various practical cases by an expert person in the field without any especial difficulties, as the measurements of the blanks are standard and in any case can be known previously.

The collecting head 30, after the depression source has been activated to couple the top blank 20 to the contact elements 31, rotates the top blank 20 with respect to the axis 0 passing through the opposite and peripheral edge (FIG. 3C), such as to obtain all the relative advantages already expressed when discussing the proposed method.

The top blank 20 is preferably rotated such as to bring it into a horizontal position, as illustrated in FIG. 3C.

The collecting head 30, with the blank it has picked up, now raises vertically (for the advantages of this, please refer to the detailed examination of the proposed method) and translates or roto-translates up to the input 40 of the marking apparatus 4, and then descends in order to deposit (by deactivation of the depression source) the blank 200, for example at a conveyor belt 400 comprised in the marking apparatus 4 (see FIG. 4A), which brings the single and separated blank 200 towards labeling means 401 (FIG. 4B) and/or printing means 402 (for example a laser printer) (FIG. 4C).

The various functioning operations of the transfer device 3 as described above are cyclically repeated (collecting cycle) up to removing one at a time all of the blanks from a stack 2 or plurality of stacks 2 and transferring them to the marking apparatus 4.

After this, the conveyor device 1 advances other stacks 2 and the various operating cycles are repeated in a way which is easily derivable.

In the following a description will be made of particular embodiments of the conveyor device 1, with reference to FIG. 1.

The conveyor device comprises a conveyor means having a straight development 1000 which in turn comprises:

a conveyor branch 1001 that is straight, elongate and horizontal destined to slide longitudinally, and several support elements 100,101,102,103,104 (made in a special way which will be fully described herein below) in use projecting superiorly from the conveyor branch 1001 and drawn in a horizontal translation by the longitudinal sliding of the conveyor branch 1001 itself.

The support elements 100,101,102,103,104 have a prismatic shape with a triangular base, and have a larger surface 10 (which is not the most extended side of the prism) and a smaller surface 11 that are rectangular, consecutive, oblique with respect to horizontal planes, inclined to one another at an upper corner 105 of a right or obtuse angle (preferably one hundred degrees) and are further arranged transversally to the longitudinal development of the transport branch 1001.

In twos, the support elements are in use consecutive in the longitudinal development of the conveyor branch 1001 and are also arranged with respect to one another in such a way that the larger surface 10 of one and the smaller surface 11 of the other together define the V-seating of the mobile housing, from which the angle that forms between the first and the second rest surface is equal to the larger angle as mentioned above (which is the larger internal angle of the triangular surfaces of the prism).

In this way the line of housings 10,11,100,101,102,103, 104 is obtained for the inclined stacks which makes the conveyor device 1 capable of attaining the cited advantages.

According to preferred constructional aspect, see FIG. 1 once more, the conveyor means 1000 comprises a plurality of transversal plates 110 flanked two by two such as to define a closed sliding conveyor loop, the closed loop being guided by guide means, in turn comprising two return pulleys, and further guide components within the knowledge of the person expert in the field of mechanical engineering for looped conveyors.

The conveyor loop is wound about the pulleys; the loop superiorly, and instant by instant, defines the straight conveyor branch 1001, in which the plates 101 are coplanar.

Further, the conveyor device 1 comprises activating means for activating the sliding of the conveyor loop, for example chains connected to the plates or motors connected to the pulleys or other motorized means known to the expert person in the sector.

It is important that in this embodiment each plate 101 fixedly bears a polyhedral member 100,101,102,103,104 projecting externally of the closed loop, which is a portion of one of the conveyor elements.

The polyhedral members are advantageously arrangeable with respect to one another when the relative plate 101 is in the upper straight branch 1001, such as to form together a plurality of consecutive conveyor elements two by two defining a relative V-seating.

In the case represented in FIG. 1, each prismatic conveyor element is sub-divided into five polyhedral members 100, 101,102,103,104, which have a shape corresponding to the sections of a prism which is cut by four parallel planes perpendicular to the larger-size surface, which, in practice, in the case of the support elements, is the one located at the top of the flanked plates 101.

The polyhedral member denoted by 100 is the one which comprises the above-mentioned top corner and thus the one which defines the angle of inclination of the V-seating and therefore the stack 2 resting therein.

By changing the polyhedral members 100,101,102,103, 104, the following is changed: the number of mobile housings (and therefore the number of stacks 2 that are contemporaneously transportable), the inclination of the stacks 2, the type of blanks housable, etc.

Thus, with this constructional solution, a conveyor device 1 is obtained which can be implemented in particular cases with the maximum of flexibility.

In still more detail, the plates 110 can be singly pivoted about a respective median axis 11, transversal to the conveyor loop such that when they slide in a curved pathway 1011 guided by one of the return pulleys, the respective polyhedral members 100,101,102,103,104 can be arranged distanced and splayed with respect to the other polyhedral members of consecutive plates 101.

In this way smaller pulleys can be used, and in general a conveyor device 1 can be made which, given equal length, has a smaller loop.

The above has been described by way of non-limiting example, and any eventual constructional variants are intended to fall within the ambit of protection of the present technical solution, as claimed herein below.

The invention claimed is:

1. A conveyor device for transporting blanks destined to form cases, which blanks are presented either in an open and flat configuration or in a flattened tubular configuration,
   wherein the device comprises at least a mobile housing suitable for housing and transporting a quantity of blanks piled one on another to form a stack, the stack having a base defined by a blank located at a bottom of the stack, and a plurality of sides, each of which is defined by a set of lateral edges, facing in a same direction, of the plurality of blanks;
   and wherein each housing comprises a first rest surface and a second rest surface, both surfaces being flat and oblique with respect to horizontal planes, which first and second surfaces are inclined with respect to one another by an internal angle, which is a right-angle or which is obtuse, such as to define a seating having a V-profile, the first and second rest surfaces being of such dimensions that a stack of blanks can be received and conveyed resting in the V-seating with the base thereof resting on the first surface and with a rest side of the stack resting on the second surface for all of a height thereof, so as to define, between the base and the rested side of the stack, an angle which is equal to the angle between the first and the second surfaces of the V-seating,
   whereby the stack is inclined, when housed in the housing, with each of the blanks resting on a lower surface thereof and on one of the lateral edges thereof, and further comprising:
   a straight-developing conveyor means, comprising both a straight least two support elements which in use project superiorly from the conveyor branch, which, in use, are drawn in a horizontal translation by longitudinal sliding of the conveyor branch and which have a shape of a prism having a triangular base, each projecting support element further having a larger surface and a smaller surface that are rectangular, consecutive and oblique with respect to horizontal planes, inclined to one another at an upper corner by an upper angle, being a right-angle or an obtuse angle, and arranged transversally to the longitudinal development of the conveyor means, the two support elements being, in use, consecutive in the longitudinal development of the conveyor branch and also arranged with respect to one another such that the larger surface of one and the smaller surface of the other together define the V-seating of the mobile housing, in which the larger surface of a support element is the first rest surface and the smaller surface of the other support element is the second rest surface, whereby the angle formed between the first and the second rest surface is equal to said upper angle, and,
   wherein the conveyor means comprises a plurality of transversal plates, flanked two by two such as to define a closed sliding conveyor loop, the closed loop being guided by guide means, included in the conveyor device, comprising two return pulleys about which the conveyor loop is wound such that the conveyor loop superiorly defines, instant by instant, said elongate and horizontal straight conveyor branch, in which the plates are coplanar; the conveyor device comprising activating means for activating the sliding of the conveyor loop, each plate fixedly bearing a polyhedral member projecting externally of the closed loop, each polyhedral member being a portion of one of said conveyor elements, the polyhedral members being arrangeable with respect to one another, when the respective plate is in the upper straight branch, in such a way as to form together a plurality of said conveyor elements, which are consecutive and defines two-by-two a relative V-seating.

2. A method for supplying blanks, destined to form cases, to a marking apparatus for application of signs and/or labels to a surface of the blanks, the marking apparatus having an inlet for taking delivery of the blanks, each blank being presented either in an open and flat configuration or in a flattened tubular configuration, the method comprising the following steps:
   providing the conveyor device of claim 1 for transporting blanks destined to form cases, which blanks are presented either in an open and flat configuration or in a flattened tubular configuration, and using the conveyor device for:
   a. predisposing a quantity of blanks piled one on another to form a stack, having a base defined by a blank located at a bottom of the stack, a top defined by an upper blank placed onto the other blanks in the stack, and a plurality of sides, each of which is defined by a set of lateral edges of the plurality of blanks which faces in the same direction;
   b. arranging the stack in an inclined configuration in which it is resting both on the base thereof and on a side thereof, with each of the blanks in the stack resting both on a lower surface thereof and on a lateral edge thereof comprised in the set defining the rested side thereof;
   c. bringing the stack, while maintaining it in the inclined configuration, up to a removing position in proximity of the marking apparatus (4);
   d. rotating the upper blank upwards and with respect to a horizontal axis passing at an edge of the blank which is opposite and more peripheral with respect to the edge of the same blank comprised in the set defining the rested side of the stack, the axis remaining fixed with respect to the stack during the rotation of the upper blank;
   e. raising the rotated upper blank, distancing it from the stack, and then bringing the upper blank to the inlet of the marking apparatus, whereby the blank can be taken delivery of by the marking apparatus;
   f. repeating step d. and step e., applying them to each blank which in turn defines the top of the stack, including the blank defining the base of the stack when the said blank remains as the only blank in the stack.

3. The method according to claim 2, wherein, in the inclined configuration in which the stack is arranged during step b., an internal angle which is formed between the rested base and the rested side is a right-angle or is obtuse.

4. The method according to claim 32, wherein the internal angle is of one hundred degrees.

5. The method according to claim 2, wherein: in step a., a plurality of stacks is provided;
- the stacks are arranged in a line in which each stack is in the inclined configuration of step b.;
- the line of stacks is advanced longitudinally, with a step-advancement, up to when a first stack of the line reaches the removing position, when the line stops;
- the following steps are cyclically performed: steps d., e. and f. are applied to the blanks of the first stack located in the removing position and, in the meanwhile, one or more further stacks are added to the line of stack, after which, once all the blanks of the first stack, which is in the removing position, have been taken to the inlet of the marking apparatus, the line of stacks, having a new first stack, is advanced stepwise up to when the new first stack reaches the removing position.

6. The conveyor device of claim 1, further comprising a plurality of mobile housings arranged in a line, which line is longitudinally slidable in a conveying direction with respect to which the rested side of the stack is rearward with respect to an opposite side, whereby the rested side is interested by the inertia stresses due to the motion and to its resting on the second rest side of the V-seating.

7. The conveyor device of claim 1, wherein the internal angle between the first and the second rest surface is of one hundred degrees.

8. The conveyor device of claim 1, wherein the plates are singly pivoted about a respective median axis, transversal to the conveyor loop such that, when the plates slide in a curved trajectory guided by one of the return pulleys, the polyhedral members can be arranged distanced and splayed with respect to the other polyhedral members of consecutive plates.

9. A transfer device for blanks destined to form cases, suitable for functionally cooperating with the conveyor device of claim 5 and with a marking apparatus for application of signs and/or labels to a surface of a blank, which marking apparatus has an inlet for taking delivery of blanks, wherein the transfer device comprises:
- a collecting robot having at least three degrees of freedom comprising a collecting head which is rotatable with respect to a horizontal rotation axis, the head further being vertically mobile and translatable in a direction or a plurality of directions in space; and
- depression means fixedly mounted in the collecting head comprising at least a contact element for abutting a blank and connecting the blank to a depression source activatable and deactivatable such that the depression means can alternatingly grip or release a blank abutting with the contact element;
- the horizontal rotation axis of the collecting head being arranged, with respect to the contact element, in such a way that when the robot is operated to place the contact element in contact with the upper blank located at the top of the stack presented in an inclined configuration in which there is a right-angle or an obtuse angle between a bottom thereof and a side thereof, defined by lateral edges of the blanks which are facing in a same direction, then the horizontal rotation axis passes at an edge of the upper blank which is opposite and more peripheral with respect to the edge of the same blank comprised in the set of edges defining said side of the stack.

10. A supply system for supplying blanks, destined to form cases, to a marking apparatus (4) for application of signs and/or labels to a surface of each blank, which blanks are presented to the supply system piled on one another in stacks (2) in which each blank is either in an open and flat configuration or in a flattened tubular configuration, wherein the supply system (1, 2) comprises:
- the conveying device of claim 1; and,
- a transfer device which comprises a collecting robot having at least three degrees of freedom comprising a collecting head which is rotatable with respect to a horizontal rotation axis, the head further being vertically mobile and translatable in a direction or a plurality of directions in space; and
- depression means fixedly mounted in the collecting head comprising at least a contact element for abutting a blank and connecting the blank to a depression source activatable and deactivatable such that the depression means can alternatingly grip or release a blank abutting with the contact element;
- the horizontal rotation axis of the collecting head being arranged, with respect to the contact element, in such a way that when the robot is operated to place the contact element in contact with the upper blank located at the top of the stack presented in an inclined configuration in which there is a right-angle or an obtuse angle between a bottom thereof and a side thereof, defined by lateral edges of the blanks which are facing in a same direction, then the horizontal rotation axis passes at an edge of the upper blank which is opposite and more peripheral with respect to the edge of the same blank comprised in the set of edges defining said side of the stack.

* * * * *